Figure 1:
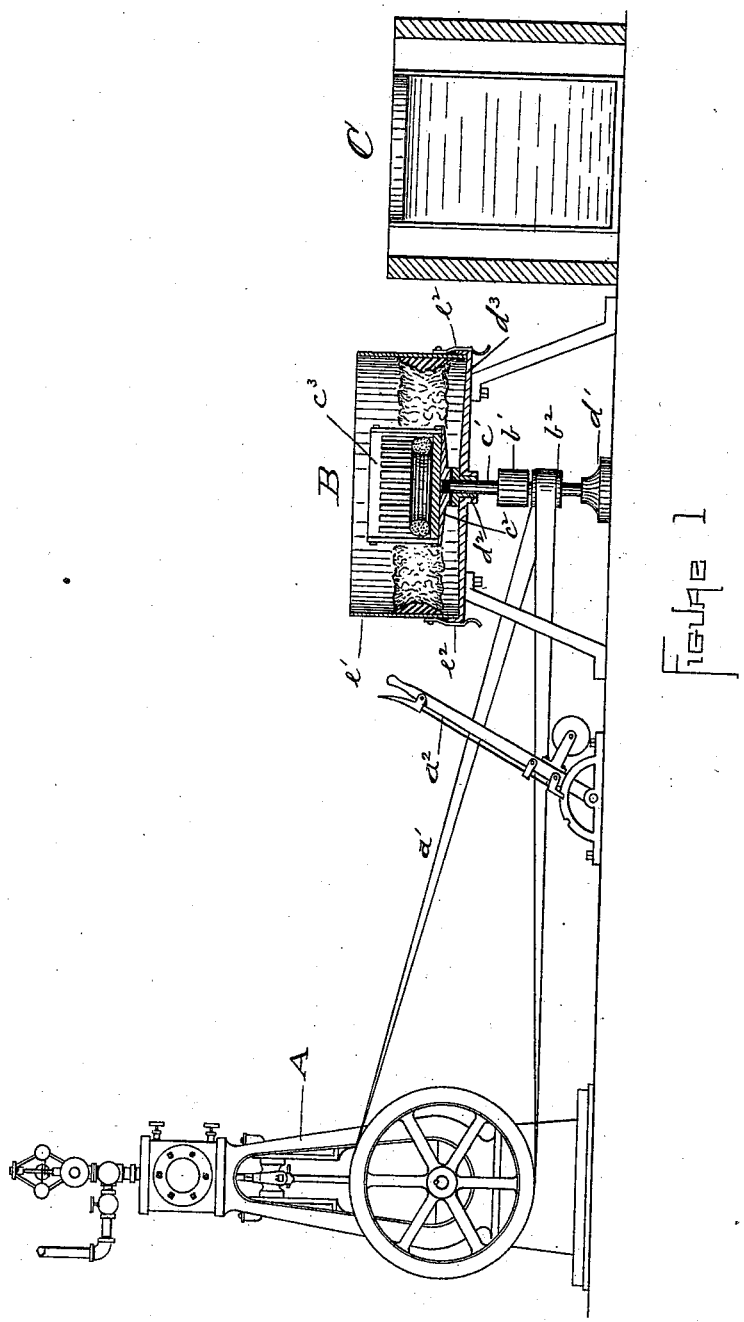

(No Model.)  3 Sheets—Sheet 1.

G. C. REESE.
MANUFACTURE OF GALVANIZED, TINNED, AND COATED WIRE.

No. 551,096. Patented Dec. 10, 1895.

WITNESSES:
Walter Reese
Horace E James

INVENTOR
George C Reese,
by
Frank M Reese,
ATTORNEY (No Model.) 3 Sheets—Sheet 2.

G. C. REESE.

MANUFACTURE OF GALVANIZED, TINNED, AND COATED WIRE.

No. 551,096. Patented Dec. 10, 1895.

WITNESSES:

INVENTOR

George C. Reese by Frank M. Reese

ATTORNEY.

(No Model.) 3 Sheets—Sheet 3.
G. C. REESE.
MANUFACTURE OF GALVANIZED, TINNED, AND COATED WIRE.

No. 551,096. Patented Dec. 10, 1895.

WITNESSES:

INVENTOR
George C. Reese,
by
Frank M. Reese
ATTORNEY.

UNITED STATES PATENT OFFICE.

GEORGE C. REESE, OF SHARON HILL, PENNSYLVANIA.

MANUFACTURE OF GALVANIZED, TINNED, AND COATED WIRE.

SPECIFICATION forming part of Letters Patent No. 551,096, dated December 10, 1895.

Application filed February 16, 1894. Serial No. 500,388. (No model.)

*To all whom it may concern:*

Be it known that I, GEORGE C. REESE, a citizen of the United States, residing at Sharon Hill, in the county of Delaware and State of Pennsylvania, have invented certain new and useful Improvements in the Manufacture of Galvanized, Tinned, and Coated Wire; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to the manufacture of metallic coated wire having a smooth, uniform, flexible coating of spelter, tin, or other material by a method which obviates many of the highly-objectionable features heretofore always marking and characterizing the use of the modes of manufacture known and used in the prior state of the art, thereby insuring not only rapidity of production, high quality of product, great decrease of fuel, labor, capital, interest, and other charges, but also producing many new grades of very fine wire or coated material heretofore unknown to the trade.

The usual method of manufacturing galvanized wire, as heretofore practiced, and its inherent disadvantages, were as follows: A number of previously-prepared wires were drawn slowly by tension through a bath of galvanizing material, and upon emerging therefrom through tightly-enveloping wipers of asbestos or other material to drive off more or less perfectly the excess of coating upon their surfaces. This method was necessarily slow because the time of transit through the bath is fixed by the fact that the temperature of the wire must be raised to or approximately to that of the spelter in order that it may receive a thin durable coating and also because of the frequent breakage of the wires from the tension exerted upon them by the action of the drawing and reeling devices. The speed at which No. 12 wire was coated being from about fifty to sixty feet per minute, this gage runs from one-quarter to one-half mile and smaller gages several miles in length to the bundle. Hence, although many inventions have been patented, and some adopted, for increasing the production and decreasing the breakage by complicated devices for drawing larger numbers of wires through the bath and wipers and by giving notice of undue strain exerted upon the wires by tension, the output of each pot was and necessarily will be low in the use of this old method. This in itself called for the use of a large number of galvanizing-pots in order to bring up the output of the factory to the paying-point, any increase in the speed of drawing inevitably requiring a corresponding increase in the length of the pots, because the time of transit through the bath could not be shortened below the limitation before mentioned, and as the depth and width of the bath must be considerable, for reasons hereinafter noted, the constant maintenance of an enormous tonnage of spelter in a fluid condition and constantly exposed to oxidation and to the destructive alloying action of the metallic surfaces of the pots entailed great loss, trouble, and annoyance by the rapid formation of "dross" and oxides. The weight of fluid spelter was necessarily enormous as compared with the weight of the daily output and very large as compared with the metallic surfaces of the pots, because the percentage of dross had to be kept down as low as possible to insure proper fluidity and working of the bath. This dross consists mainly of spelter, which stiffens after alloying with a very small percentage of iron, derived mainly from the inner surfaces of the pots, and sinks down toward the bottom of the bath. Its formation has, in conjunction with the necessity of drawing the wires slowly through long, deep, wide baths entailed great loss, labor, and expense. It is a self-evident fact that the smaller the amount of wire drawn through each pot per diem the greater will be the proportionate length of time the spelter is required to be maintained in a highly-heated fluid condition and subject to oxidation and the formation of dross and vice versa. It will be seen, therefore, that the method of drawing wire through a bath and wipers is radically defective in its principle of operation of progressively subjecting succeeding portions of the coating to the action of the wipers by means of tension, apart from any defects in apparatus used for such purpose; yet notwithstanding such fact it has continued in use as the only practical method heretofore known to the art for giving a good and reasonably-uniform coat to ordinary or fine wire.

It has long been customary to facilitate the galvanizing of small articles by submerging a charge of them contained in a basket or ladle in a bath of coating material, and after receiving sufficient spelter the charge was elevated and dropped through a shaking apparatus or mechanical agitator adapted to keep the surfaces of the articles separated from each other until the coating was solidified, and to knock or shake off some of the coating. Heavy coils of wire were also, after being submerged in a molten bath, subjected to a jarring operation by hand upon a block, the coil being gradually turned by shifting the tongs in order to knock off the superflous metal to loosen the strands and bring all parts of the bundle under the direct action of the blows. It has also been proposed to perform the latter jarring and shaking operation by a mechanical device; but this mode is applicable only to coarse rough work in short lengths of wire in bundles containing but a few strands of heavy wire. The adhesive and cohesive force of the rapidly-soldifying spelter and the capillary attraction exerted by the numerous strands in bundles of very fine wire prevents the thorough elimination of the excess of coating material. The shock and jar at any given instant of time is mainly upon those parts of the strands directly under the action of the blow and the spelter sets too rapidly to permit the continued action necessary to ultimately bring all parts of the strands under sufficient jar to prevent the soldering together of the strands in large bundles or bundles of fine wire. It was not possible, therefore, for this or any similar process to compete with the old wiping process, because by its use an even and uniform coat of spelter could not be produced on heavy wire and the strands of fine wire could not be prevented from welding together.

After years of careful experimenting I have succeeded in producing galvanized and coated wire of all sizes from the largest to the smallest gages in a cheap, rapid, and efficient manner at a speed heretofore impossible, and of a quality, uniformity, and finish of coating unexcelled by that of the wiping process. I do this by means of a method of operation that absolutely prevents all breaking by tension and all imperfect ends as occurring in the wiping method; that obviates the necessity of keeping a large tonnage of spelter constantly heated and exposed to the formation of dross by alloying and oxidation, and reduces investment, capital, interest, fuel, labor, and other incidental charges and enables the manufacturer having a small cheap plant to exceed the output of the large costly plants now in use. The securing of all these results is obtained by a radical departure from the principle of operation of the old wiping and jarring-off methods of progressively applying force to successive parts of the wire or bundles; and in lieu thereof I subject each and every portion of the coating upon the wire simultaneously to the action of a centrifugal strain greater than that amount of the combined adhesive and capillary attraction in action in retaining any superfluous material upon the surface of the wire or between the strands of the bundle, thereby leaving a smooth, flexible, adherent, and uniform coating upon the surface of the product.

I will now describe my invention more fully, so that others skilled in the art to which it appertains may make and use the same.

Figure 2:
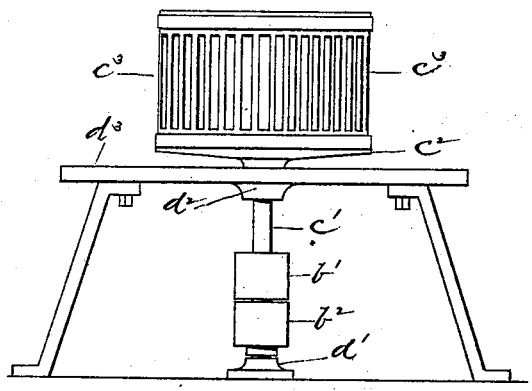
Figure 3:
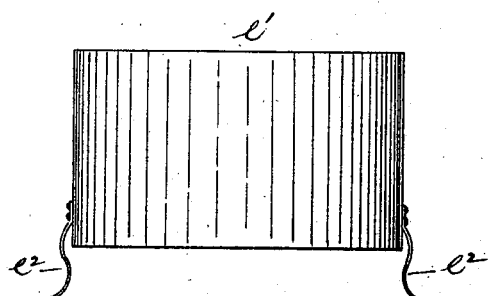
Figure 4:
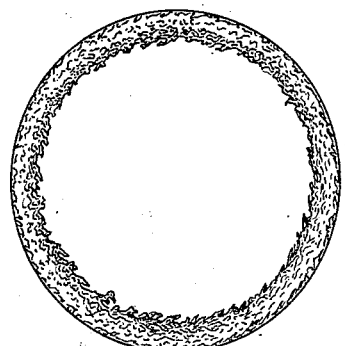
Figure 5:
Figure 6:
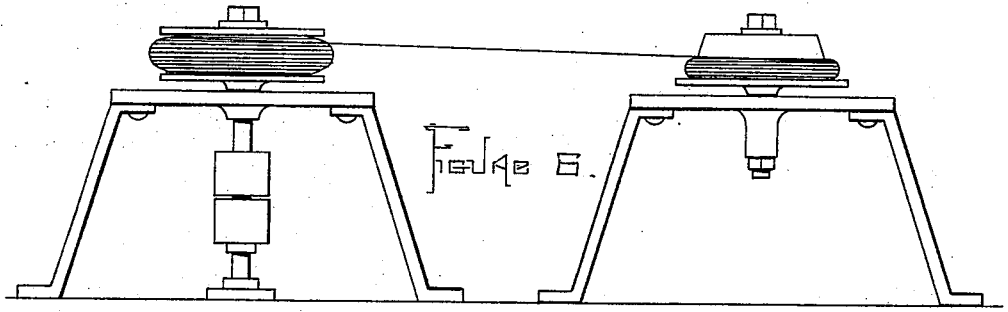
Figure 7:
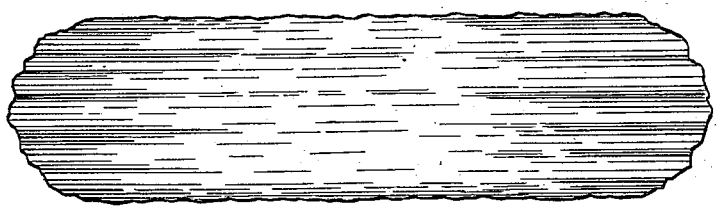
Figure 8:
Figure 9:
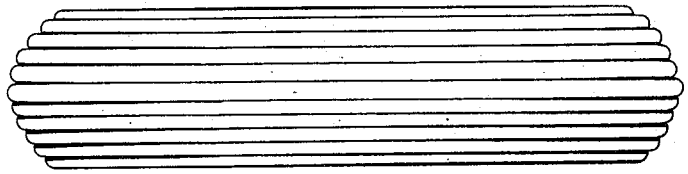
Figure 10:
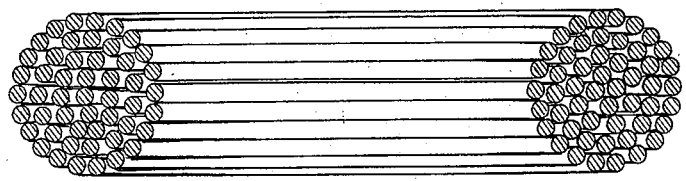

In the drawings, Figure 1 is a view of a plant, partly in central section, showing the interior of a galvanizing furnace and pot and the interior of a centrifugal separator containing in section a bundle of wire, a centrifugal cage, and a section of a solid ring of solidified spelter which has been formed after being driven off from the bundle against the safety-shield. Fig. 2 indicates a side elevation of a centrifugal separator with its safety-shield removed. Fig. 3 indicates a side elevation of the safety guard or shield detached from the centrifugal separator, showing the spring-clamps by which it is snapped into the stationary table. Fig. 4 indicates a plan view of the annular ring of spelter shown in section in Fig. 1. Fig. 5 indicates a sectional view of the same, showing more clearly the inner surface of the ring. Fig. 6 indicates a side elevation of an apparatus adapted to be used in unwinding and rewinding the wire after the bundles have been subjected to the action of the centrifugal separator. Fig. 7 indicates a side elevation of a bundle of galvanized wire having an excessive amount of coating material attached to it previous to its treatment in the centrifugal separator. Fig. 8 indicates a vertical section of the same, showing the spaces between the wires or strands filled up with an excess of coating material. Figs. 9 and 10 indicate, respectively, a side elevation and a vertical section of the bundle of wire shown in Figs. 7 and 8 after it has been subjected to the action of the centrifugal separator, showing all the excess of coating material removed from the surface of the wire and from the spaces between the strands.

Like letters of reference indicate like parts wherever they occur.

A indicates a high-speed engine provided with suitable belting $a'$ and belt-shifter $a^2$, operating a "whizzer" or centrifugal machine, as will be well understood by the skilled mechanic.

B indicates a form of centrifugal machine that I have constructed in such a manner as to adapt it for use in the operation of my improvement. This centrifugal machine is provided with a set of tight and loose pulleys $b'$ and $b^2$, respectively adapted to receive motion from the belt $a'$, and are secured on a vertical shaft $c'$, mounted in a journal-box $d'$, located at its lower end and a journal-box $d^2$, fitted into the center of the table $d^3$. Upon the upper end of the shaft $c'$ is rigidly secured a disk-plate $c^2$, provided near its periphery with a series of vertically-projecting bars $c^3$, which extend up to near the top of the machine and are preferably united at their upper ends by an annular band to insure strength and stability. These bars $c^3$ are preferably made of a triangular shape and are set in the disk in such a manner as to bring one of their edges toward the center of the disk, the object being to reduce to a minimum the amount of surface in contact with the coil or bundle of wire and at the same time to secure the requisite strength and stiffness. The cage formed by these bars $c^3$ and the disk $c^2$ is preferably of a diameter somewhat larger than the coil to be operated upon.

$e'$ indicates a stationary metallic safety-shield of cylindrical form, secured by snap-springs $e^2$ to the top of the stationary table $d^3$, the latter being supported upon legs, as shown, or in any suitable manner.

The galvanizing-pot C may be made of cylindrical form in order to offer less surface to the alloying action of the spelter in comparison with its holding capacity than those in ordinary use, and its diameter may be reduced to a size very near that of the coils or bundles to be operated upon. The pot C rests upon its bottom in the usual manner and is surrounded by the usual fire-chamber.

The coils or bundles are composed of wire prepared in the usual manner to receive their coating, and are preferably bound loosely together. A whole bundle is dipped into the bath of melted spelter, and when it has received a thorough coating it is removed to and dropped into the centrifugal machine, which may be in motion for small or light coils, or the machine may be started after heavy bundles are placed in it. After a short space of time the wire attains the same speed as the machine and the surplus liquid coating is almost instantaneously thrown off violently against the safety-shield. The machine should then be stopped and the bundle removed. This part of the process should be performed with the utmost speed that the workman is capable of, in order that none of the coating may solidify until after its removal from the machine. The wire should then be subjected to some operation designed to prevent the strands from becoming welded together when such solidification takes place. This may be accomplished by jarring the bundle on a block in the usual manner to keep the different strands in motion or separated from each other. I prefer, however, to place the bundles on the reels shown in Fig. 6 and unwind the bundle and rewind it in such a manner that the coating may solidify while in transit from the unwinding to the rewinding reel. When it is desirable to rewind the bundles at a more convenient time or place, they may be allowed to cool off after having come from the centrifugal machine and afterward reheated, and where it is necessary to retain the heat of the bundles for a long time, as occurs in long lengths of fine wire, the unwinding-reel is heated and a heated muffle placed around it.

In practice I find that a speed of twelve hundred and fifty revolutions per minute is sufficiently high to do good work on No. 12 wire in bundles of ten inches diameter. Larger gages will work at less speed on account of retaining the heat longer and because less capillary attraction is exerted where the spaces between the wires are greater. Variation of the initial heat of the bath also causes variation in the cohesive force of the spelter, and variation of the chemical constituents of the latter is also a factor, as some baths work more fluid than others at a given temperature. Smaller gages of wire and smaller bundles also call for an increased elevation of the speed of rotation, but in general I have found that the best results are produced at from one thousand to three thousand revolutions per minute when operating upon ten-inch bundles.

In practice I use a New York safety high-speed engine provided with an adjustable governor, and recommend the same, as the engine can be adjusted at once to give any degree of speed necessary.

The chief advantages of my invention are:

First. As it is only necessary to subject an entire bundle of wire for a few seconds of time to the action of the centrifugal separator, instead of drawing a small number of strands through wipers at the slow speed of not more than one foot per second, as in the old wiping process, I am enabled to finish the bundles as fast as they can be raised to the proper temperature and coated in the galvanizing-pot. Hence the tonnage output per pot is enormously increased, especially so on the fine wires, some of which are many thousands of feet in length to the single pound, and which could not be made for general consumption on account of the prohibitive price of such galvanized product.

Second. The vast increase from each pot renders few of them necessary in plants of large tonnage capacity, thereby saving a large proportion of the first cost, cost of repairs, fuel, and labor.

Third. As few and comparatively small pots are used but little spelter is required to be constantly kept in a molten condition subject to continuous oxidation and the formation of dross from the alloying action of the metal of the pots. The large amount of capital heretofore required to purchase and maintain in a fluid condition the enormous tonnage of costly spelter in comparison with the output is not required for such purpose.

Fourth. Like the old wiping process it produces a smooth, uniform, flexible coat of galvanizing material upon the wire, but has the added advantage of having no breakage from tension and no waste ends on the bundles Fifth. One of the chief advantages is that many forms of manufactured wire may be coated, which could not be coated by the old wiping process—such as barb-wire, flat twisted wire or bands, wire rope, braid and wire cord.

Finally. It saves capital on account of less labor, fuel, and power, concentrates size of plant, requires less ground, buildings, repairs, insurance, &c., and enables the manufacturer of galvanized wire to produce, in a cheap and rapid manner, many grades of very fine wire heretofore unknown to the trade.

Having described my invention, what I claim, and desire to secure by Letters Patent, is—

1. The method of manufacturing galvanized, tinned or coated wire, which consists in subjecting the wire in the form of a bundle or coil to a galvanizing or other coating bath, and then rapidly revolving the thus coated bundle or coil, while the coating is still fluid, whereby the excess of coating is removed by centrifugal action, substantially as described.

2. The method of manufacturing galvanized, tinned or coated wire, which consists in subjecting the wire in the form of a bundle or coil to a galvanizing or other coating bath and then rapidly revolving the thus coated bundle or coil while the coating metal is still fluid, whereby by centrifugal action the excess of coating is removed and the wire left clear and smooth, and thereafter unwinding the wire and rewinding it to prevent adhesion of the various strands or coils, substantially as described.

In testimony whereof I affix my signature in presence of two witnesses.

GEORGE C. REESE.

Witnesses:
CHAS. BONSALL,
ADAM J. GOTSHALL.